US008464092B1

(12) United States Patent
Gentes et al.

(10) Patent No.: US 8,464,092 B1
(45) Date of Patent: Jun. 11, 2013

(54) SYSTEM AND METHOD FOR MONITORING AN APPLICATION OR SERVICE GROUP WITHIN A CLUSTER AS A RESOURCE OF ANOTHER CLUSTER

(75) Inventors: James C. Gentes, San Francisco, CA (US); Anand Hariharan, San Jose, CA (US); Indira M. Uppuluri, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 13/476,156

(22) Filed: May 21, 2012

Related U.S. Application Data

(63) Continuation of application No. 10/954,593, filed on Sep. 30, 2004, now Pat. No. 8,185,776.

(51) Int. Cl.
*G06F 11/00* (2006.01)

(52) U.S. Cl.
USPC ............ 714/4.11; 714/5.1; 714/25; 714/38.1; 714/48; 709/245

(58) Field of Classification Search
USPC ........................ 714/5.1, 25, 38.1, 48; 709/245
See application file for complete search history.

(56) References Cited

U.S. PATENT DOCUMENTS

| 5,524,212 | A  | * | 6/1996  | Somani et al. | 711/121 |
|-----------|----|---|---------|---------------|---------|
| 5,999,712 | A  | * | 12/1999 | Moiin et al. | 709/220 |
| 6,195,676 | B1 | * | 2/2001  | Spix et al. | 718/107 |
| 6,393,485 | B1 | * | 5/2002  | Chao et al. | 709/231 |
| 6,421,787 | B1 | * | 7/2002  | Slaughter et al. | 714/4.1 |
| 6,438,705 | B1 | * | 8/2002  | Chao et al. | 714/4.11 |
| 6,449,641 | B1 | * | 9/2002  | Moiin et al. | 709/220 |
| 6,609,213 | B1 | * | 8/2003  | Nguyen et al. | 714/4.12 |
| 2001/0054020 | A1 | * | 12/2001 | Barth et al. | 705/37 |
| 2002/0023173 | A1 | * | 2/2002  | Jacobs et al. | 709/245 |
| 2002/0154646 | A1 | * | 10/2002 | Dubois et al. | 370/406 |
| 2003/0126240 | A1 | * | 7/2003  | Vosseler | 709/221 |
| 2003/0159084 | A1 | * | 8/2003  | Murphy et al. | 714/13 |
| 2003/0177411 | A1 | * | 9/2003  | Dinker et al. | 714/13 |
| 2005/0108593 | A1 | * | 5/2005  | Purushothaman et al. | 714/4 |

* cited by examiner

*Primary Examiner* — Joshua P Lottich
*Assistant Examiner* — Jeison C Arcos
(74) *Attorney, Agent, or Firm* — Campbell Stephenson LLP

(57) ABSTRACT

Various systems and methods for monitoring an application or service group within one cluster as a resource of another cluster are disclosed. In one embodiment, a method involves detecting an error indication generated by a first cluster (e.g., the error indication can be generated by a cluster controller or service group within the first cluster). The first cluster is implemented on a cluster resource (e.g., a virtual machine) of a second cluster. In response to detecting the error indication, restart of the cluster resource is initiated.

20 Claims, 6 Drawing Sheets

SYSTEM AND METHOD FOR MONITORING AN APPLICATION OR SERVICE GROUP WITHIN A CLUSTER AS A RESOURCE OF ANOTHER CLUSTER

CROSS-REFERENCE TO RELATED APPLICATIONS

This application is a continuation of U.S. patent application Ser. No. 10/954,593, entitled "System and Method For Monitoring An Application or Service Group Within A Cluster As A Resource of Another Cluster," filed Sep. 30, 2004, now U.S. Pat. No. 8,185,776 and naming James C. Gentes, Anand Hariharan, Indira M. Uppuluri as the inventors. This application is assigned to Symantec Operating Corporation, the assignee of the present invention, and is hereby incorporated by reference in its entirety and for all purposes as if completely and fully set forth herein.

FIELD OF THE INVENTION

This invention relates to clustered computer systems and, more particularly, to allowing one cluster to monitor activities taking place within another cluster.

BACKGROUND

Clustering involves configuring multiple computer systems, also referred to as nodes, to cooperate with each other in order to provide increased availability and/or load balancing of certain services. A cluster is usually viewed as a single entity by clients that use the cluster's services. In a system that is designed to provide high availability, a cluster can continue providing a particular application service to clients even if one of the nodes included in that cluster fails. In other words, programs executing on the cluster can continue to function despite a problem with one node in the cluster.

In order to reduce costs and increase utilization of physical computer systems, various virtual computing techniques are being used to subdivide a single physical computing resource into two or more "virtual machines." By subdividing a physical computing resource into multiple "virtual machines," a user can achieve greater utilization of that physical computing resource.

Using traditional clustering methods in systems that employ virtual machines tends to undermine the basic benefits of clustering, virtual computing, or both. For example, in order to use traditional clustering methods with virtual machines, each virtual machine is typically handled as a node within a cluster. However, since several virtual machines may be implemented on the same physical computing resource, this configuration does not provide the fault tolerance normally expected in clustering applications. Instead, the physical computing resource represents a single point of failure.

Furthermore, in order to be able to failover an application from one virtual machine to another, one virtual machine is required to be running in standby mode. Until a failure occurs, the standby virtual machine is using up valuable physical computing resources that could otherwise be used for other purposes. Additionally, additional software licenses may be required for the standby virtual machine, increasing the cost to the user. As these examples show, improved techniques for combining clustering and virtual computing are desired.

SUMMARY

Various embodiments of systems and methods are disclosed for monitoring an application or service group within one cluster as a resource of another cluster. In one embodiment, a method involves detecting an error indication generated by a first cluster (e.g., the error indication can be generated by a cluster controller or service group within the first cluster). The first cluster is implemented on a cluster resource (e.g., a virtual machine) that is monitored by a second cluster. In response to detecting the error indication, restart of the cluster resource is initiated.

In another embodiment, a method involves monitoring a resource implemented on a virtual machine, which is in turn implemented on the first node of a cluster. An error condition is detected in the resource. In response to the error condition, restart of the virtual machine is initiated.

In one embodiment, a system includes a cluster controller, which includes a remote agent and a cluster engine. The remote agent is configured to detect an error indication corresponding to a resource implemented on a virtual machine. The virtual machine is implemented on the first node of a cluster. The cluster engine is configured to initiate restart of the virtual machine in response to the remote agent detecting the error. The error indication is generated by a monitoring application executing on the virtual machine.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
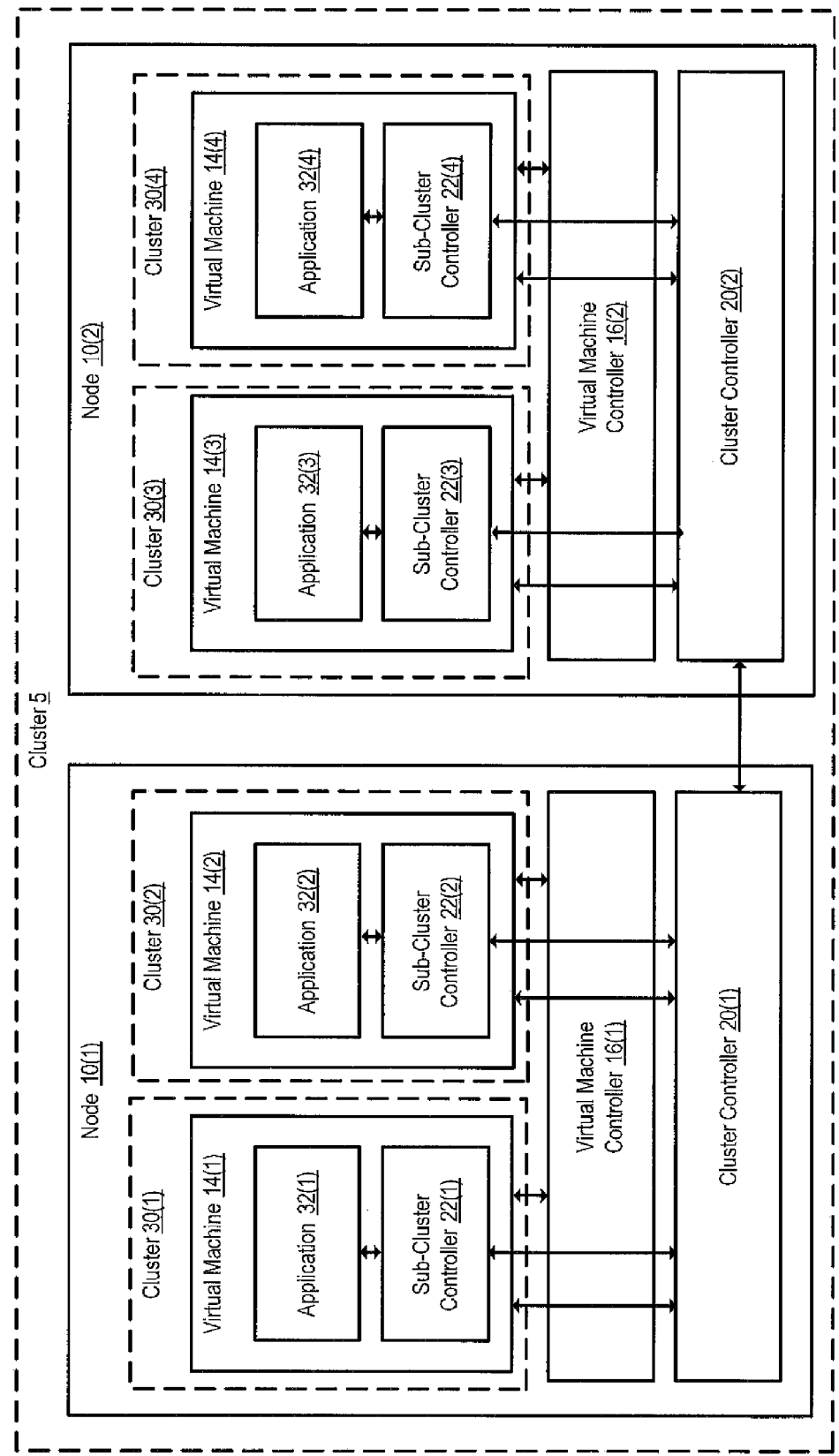
FIG. 1 is a block diagram of a cluster of nodes, each of which includes several virtual machines, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A first cluster is implemented on a cluster resource monitored by a second cluster. The second cluster monitors the first cluster in order to detect errors within the cluster resource. If an error is detected within the first cluster, the second cluster restarts the cluster resource, on which the first cluster is implemented. As an example, the first cluster can be a single-node cluster executing on a virtual machine, which is in turn implemented on one of the nodes within the second cluster. The virtual machine is a cluster resource that is being made highly available by the second cluster. The cluster controller of the second cluster can monitor the cluster controller of the single-node cluster and/or a service group within the single-node cluster. The cluster controller or service group of the single-node cluster in turn monitors an application (or other cluster resource) implemented on the virtual machine. If the cluster controller or service group of the single-node cluster generates an error indication in response to failure of the application, the cluster controller of the second cluster can restart the virtual machine (e.g., on another node within the second cluster).

Cluster resources are monitored and controlled (e.g., brought online or started, taken offline or stopped, and/or monitored) by a cluster controller. Cluster resources can include resources (e.g., virtual machines, applications, server software, and the like) that a cluster monitors in order to ensure that those resources are highly available, as well as other resources (e.g., storage devices, operating systems, file systems, network addresses, databases, and the like) on which the proper operation of the highly-available resources is dependent. Some cluster resources (e.g., virtual machines, hardware partitions, and the like) can execute an instance of an operating system. Accordingly, clustering software can be installed on such a cluster resource, allowing another cluster to be implemented on that cluster resource.

In some embodiments, various cluster resources are grouped into service groups. A service group includes a cluster resource (e.g., an application) and other resources (cluster resources and/or non-cluster resources) upon which the cluster resource depends. For example, if the cluster resource a web application, the service group can include disk groups on which web pages are stored, a logical volume built in the disk group, a file system using the volume, network interface cards to export the web service, one or more IP addresses associated with the network cards, and the web application program and associated code libraries. The resources within a service group can be dependent on each other (e.g., in the above example, the logical volume depends on the disk groups, the file system depends on the logical volume, and so on). It is noted that, in some embodiments, a service group can include a single resource.

Each cluster can include one or more service groups. Each service group can monitor the resources within that service group for failures. The cluster controller can control and monitor each service group within the cluster as a unit, allowing service groups to be stopped and started independently of each other. The cluster controller starts or stops a service group by starting or stopping each resource within the service group, in an order that satisfies dependencies between the resources (e.g., when starting the web application above, the disk groups would be started first, then the logical volume, then the file system, and so on). The cluster controller can also treat each service group as a unit when performing failovers. For example, instead of failing over all cluster resources within a node in response to a failure within one of several service groups, the cluster controller can fail over only the resources within the particular service group that experienced the failure.

FIG. 1 is a block diagram of a cluster of nodes, each of which includes several virtual machines. As shown, cluster 5 includes nodes 10(1) and 10(2). Each node 10(1) and 10(2) includes a computing device, such as a personal computer, server, cell phone, or other device. Nodes 10(1) and 10(2) communicate via one or more networks (not shown), such as Local Area Networks (LANs) and/or Wide Area Networks (WANs) like the Internet. Such networks can be implemented from a variety of different communication media, including wireless links, electrical links, and/or fiber optic links. Additionally, nodes 10(1) and 10(2) can be coupled by one or more private networks. In some embodiments, private network(s) are used to communicate cluster-specific messages, such as heartbeat messages and messages effecting cluster membership, among the nodes. It is noted that in other embodiments, a cluster includes more than two nodes. It is also noted that nodes 10(1) and 10(2) can be separated by a large distance (e.g., to facilitate wide area clustering and/or disaster recovery).

Several virtual machines 14(1) and 14(2) are implemented on node 10(1). Virtual machine controller 16(1) operates to control the resources (e.g., processors, memory, network interfaces, and the like) of node 10(1) in order to implement virtual machines 14(1) and 14(2). Similarly, virtual machine controller 16(2) operates to implement several virtual machines 14(3) and 14(4) on node 10(2). Each virtual machine 14(1)-14(4) is a machine that is implemented on physical resources (e.g., the computing devices used to implement nodes 10(1) and 10(2)) that can be shared with one or more other virtual machines. Virtual machine controllers 16(1) and 16(2) operate to control each virtual machine's utilization of the underlying physical resources. For example, if node 10(1) includes four processors, virtual machine controller 16(1) can allocate one of the processors to each of the virtual machines 14(1) and 14(2). Alternatively, a node that includes four processors can be used to implement more than four virtual machines (e.g., by allocating a certain amount of processor usage of one or more of the processors to each virtual machine). Likewise, virtual machine controller 16(2) can allocate a portion of the memory in node 10(2) to each of the virtual machines. Virtual machine controllers 16(1) and 16(2) can be implemented in software such as VMWARE™ software, from VMware, Inc., and MICROSOFT™ Virtual Server.

A respective cluster controller 20(1) or 20(2) executes on each node 10(1) and 10(2). Cluster controllers 20(1) and 20(2) communicate with each other in order to manage cluster 5. Cluster controllers 20(1) and 20(2) can be implemented using VERITAS™ Cluster Server software. In one embodiment, VMWARE™ ESX SERVER™ is used to implement virtual machine controllers 16(1) and 16(2), and cluster controllers 20(1) and 20(2) execute on the service console (e.g., a modified version of the Linux operating system) provided by VMWARE™ ESX SERVER™. Cluster controllers 20(1) and 20(2) do not execute on the virtual machines.

Another cluster controller, referred to herein as a sub-cluster controller in order to distinguish from cluster controllers 20(1) and 20(2), executes on each virtual machine. Sub-cluster controller 22(1) executes on virtual machine 14(1), sub-cluster controller 22(2) executes on virtual machine 14(2), sub-cluster controller 22(3) executes on virtual machine 14(3), and sub-cluster controller 22(4) executes on virtual machine 14(4). Like cluster controllers 20(1) and 20(2), sub-cluster controllers 22(1)-22(4) can be implemented using VERITAS™ Chister Server software.

In the illustrated embodiment, each sub-cluster controller 22(1)-22(4) controls a node of a single-node cluster. A single-node cluster is a node on which some sort of clustering controller (e.g., such as sub-cluster controllers 22(1)-22(4)) is implemented. The cluster controller of a single-node cluster can communicate with another cluster (e.g., sub-cluster controllers 22(1)-22(4) can communicate with cluster controllers 20(1) and/or 20(2)), monitor a group of cluster resources (e.g., such as one or more applications executing on the single node), and restart (or attempt to restart) a cluster resource locally on the single node if the resource experiences an error condition (e.g., an application failure, a hardware error, or the like). However, the cluster controller of a single-node cluster cannot failover the cluster resource, since there is no other node to failover to within the single-node cluster. It is noted that in alternative embodiments, each sub-cluster controller can be implemented as a controller of a multi-node cluster (as opposed to a single-node cluster). In such embodiments, a sub-cluster controller could potentially failover a cluster resource to another node within the multi-node cluster.

Implementing the sub-cluster controllers as controllers of single-node clusters provides the functionality needed to monitor cluster resources within a virtual machine as well as the functionality needed to communicate with another cluster controller (e.g., cluster controllers 20(1) and/or 20(2)). This functionality allows the sub-cluster controllers to monitor a resource within a virtual machine for another cluster controller. Using a cluster controller to provide this functionality promotes the reuse of existing components (i.e., an existing cluster controller can be modified and/or configured to provide such functionality without having to redesign the entire cluster controller). However, as noted below, certain functionality of the sub-cluster controllers may not be necessary (at least in some embodiments) to provide the monitoring and communication functionality. Accordingly, in some embodiments, this functionality can be implemented in specialized applications or devices, which do not incorporate all of the functionality that would be provided by a cluster controller, instead of a cluster controller.

It is noted that several service groups (groups of one or more resources such as applications) can be implemented within single-node cluster 30(1). Each service group can monitor an application within that service group, and sub-cluster controller 22(1) can in turn control and monitor each service group. In such an embodiment, either sub-cluster controller 22(1) or the service group (or both) can generate an error indication in response to a failure of the application. This error indication can then be monitored by cluster controller 20(1), which communicates with sub-cluster controller 22(1) to detect errors detected within the service group.

Sub-cluster controller 22(1) controls a node implemented on virtual machine 14(1), which is the only node in cluster 30(1). Since cluster 30(1) is a single-node cluster, sub-cluster controller 22(1) does not need to communicate with corresponding sub-cluster controllers on other nodes (e.g., sub-cluster controller 22(1) may not perform heartbeat messaging or other typical cluster communication). Application 32(1) executes on the node implemented by virtual machine 14(1). Sub-cluster controller 22(1) controls and monitors application 32(1). For example, sub-cluster controller 22(1) can stop and start application 32(1) as a cluster resource. Sub-cluster controller 22(1) can also monitor application 32(1) for errors. If application 32(1) cannot be restarted after an error, sub-cluster controller 22(1) generates an error indication.

Like sub-cluster controller 22(1), sub-cluster controller 22(2) controls a node implemented on virtual machine 14(2), which is the only node in cluster 30(2). As part of controlling the node within single-node cluster 30(2), sub-cluster controller 22(2) monitors application 32(2), which is executing on the node implemented by virtual machine 14(2). Similarly, sub-cluster controller 22(3) controls a node implemented on virtual machine 14(3), which is the only node in cluster 30(3). Sub-cluster controller 22(3) controls and monitors application 32(3), which executes on the node implemented by virtual machine 14(3). Sub-cluster controller 22(4) controls a node implemented on virtual machine 14(4), which is the only node in cluster 30(4). Sub-cluster controller 22(4) monitors and controls application 32(4), which executes on the node implemented by virtual machine 14(4). While this embodiment illustrates sub-cluster controllers that monitor applications executing on virtual machines, it is noted that the sub-cluster controllers 22(1)-22(4) can monitor other resources (e.g., virtual hardware) within their respective virtual machines instead of and/or in addition to applications.

Cluster controller 20(1) controls and/or monitors various cluster resources within node 10(1). In this particular example, the cluster resources monitored by cluster controller 20(1) include virtual machines 30(1) and 30(2). If cluster controller 20(1) detects an error within one of virtual machines 30(1) or 30(2), cluster controller 20(1) can communicate with cluster controller 20(2) on node 10(2) in order to restart the virtual machine that experienced the error condition to node 20(2).

Cluster controller 20(1) also monitors sub-cluster controllers 22(1) and 22(2), which in turn respectively monitor applications 32(1) and 32(2). If sub-cluster 22(1) detects an error in application 32(1), sub-cluster controller 22(1) can attempt to restart the application. If the attempt is unsuccessful, sub-cluster controller 22(1) generates an error indication.

Cluster controller 20(1) can routinely communicate with sub-cluster 22(1), and in response to detecting the error indication generated by sub-cluster controller 22(1), cluster controller 20(1) can restart (e.g., as part of a failover or switchover operation) virtual machine 14(1) on a different node, such as node 10(2). Cluster controller 20(1) can similarly restart virtual machine 14(2) on a different node in response to a failure in application 32(2). Thus, cluster controller 20(1) can restart a virtual machine in response to either a failure of the virtual machine or a failure within an application executing on (or other resource of) the virtual machine. Cluster controller 20(2) can similarly restart virtual machines 14(3) and 14(4) based on either failures of the virtual machines or failures in applications executing on (or other resources of) the virtual machines. In one embodiment, in order for cluster controllers 20(1) and 20(2) to be able to restart virtual machines on different nodes within cluster 5, virtual machine controllers 16(1) and 16(2) each register each virtual machine 14(1)-14(4), such that virtual machines 14(1)-14(4) can each be started on either node 10(1) or 10(2).

Since cluster controllers 20(1) and 20(2) can handle virtual machines as cluster resources (as opposed to handling the virtual machines as cluster nodes), the number of virtual machines that can be implemented within the system may be much greater than the maximum number of nodes supported by the clustering technology. For example, even though the clustering technology may support a maximum of 32 nodes, the clustering technology can nevertheless be used in a system that has more than 32 virtual machines. Thus, by controlling virtual machines as cluster resources, the scalability of the clustering technology can be increased.

While the above examples show cluster controllers that can communicate with sub-cluster controllers executing on virtual machines, it is noted that alternative embodiments can implement cluster controllers that communicate with sub-cluster controllers executing in non-virtual-machine environments. For example, in an alternative embodiment, a cluster controller, executing on a first physical computing device, can communicate with a sub-cluster controller that is executing on a second physical computing device. In such a system, a sub-cluster controller is simply a cluster controller that is monitored by a cluster controller of another cluster.

Figure 2:
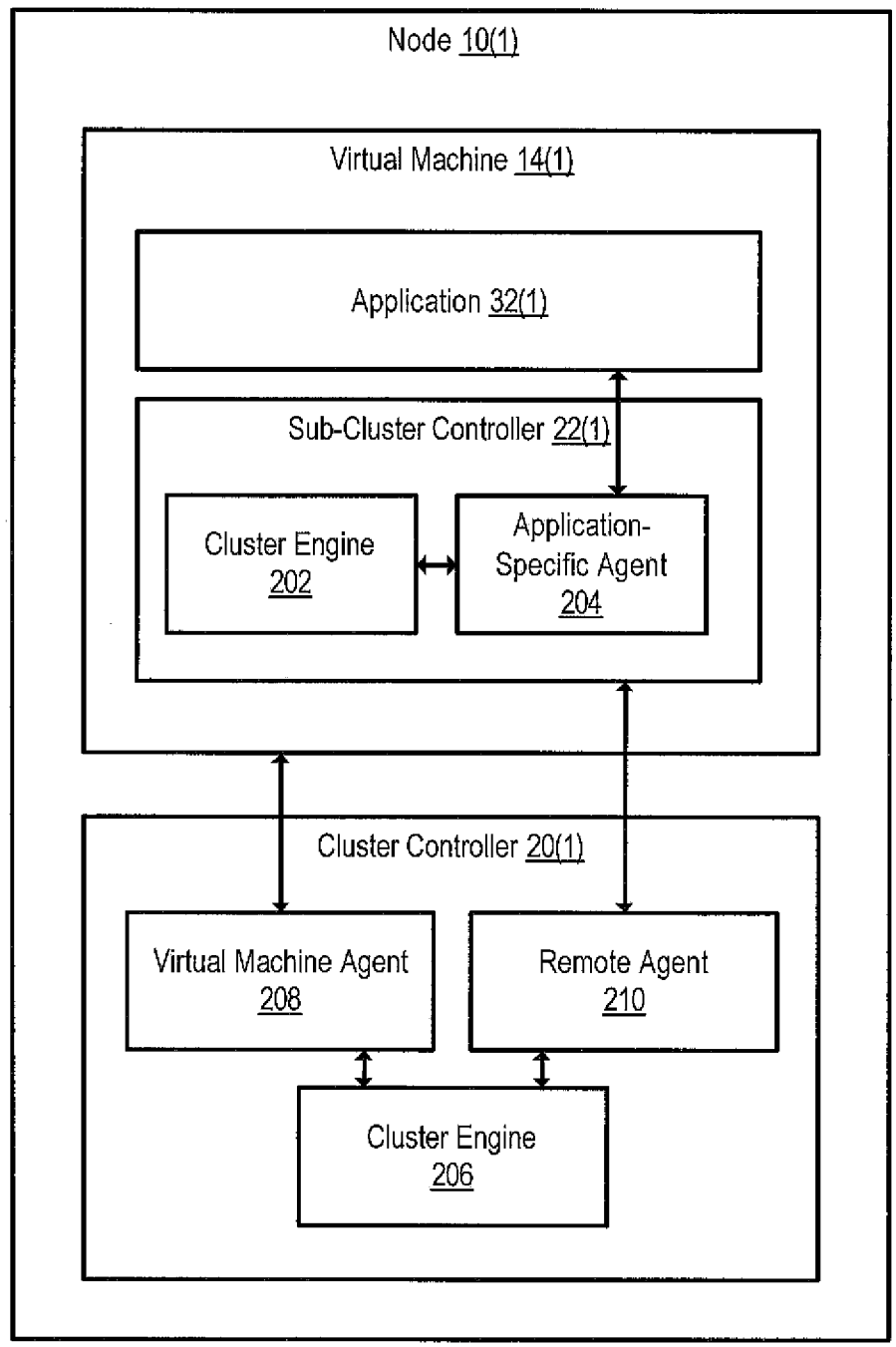
FIG. 2 is a block diagram of a node, which includes a virtual machine that is operated as a single-node cluster, according to one embodiment of the present invention.

FIG. 2 is a block diagram showing how sub-cluster controller 22(1) and cluster controller 20(1) are implemented in one embodiment. Sub-cluster controller 22(1) includes cluster engine 202 and application-specific agent 204. Cluster engine 202 handles basic cluster operations, such as building the executing cluster configuration for cluster 30(1) (as shown in FIG. 1) from configuration files, responding to operator input, and taking corrective action when a cluster resource (e.g., application 32(1)) within the cluster fails. Cluster engine 202 uses agents, such as application-specific agent 204, to monitor and manage resources like application 32(1). Since cluster 30(1) is a single-node cluster, cluster engine 202 may not include features (or such features may be disabled) that support communication such as heartbeat messaging with other nodes.

Application-specific agent 204 manages resources of a predefined cluster resource type according to commands received from cluster engine 202. In particular, application-specific agent 204 is designed to monitor and/or control applications of the same type as application 32(1). In one embodiment, application-specific agent 204 is designed to start and stop application 32(1) as well as to perform various operations to verify the functionality of application 32(1). Application-specific agent 204 can be a multi-threaded agent that can monitor several applications of the same type at substantially the same time.

Cluster controller 20(1) also includes several components, including cluster engine 206, virtual machine agent 208, and remote agent 210. Like cluster engine 202, cluster engine 206 performs basic clustering functions. For example, cluster engine 206 can be responsible for building the cluster configuration for cluster 5 (shown in FIG. 1) from configuration files, distributing information when new nodes join cluster 5, responding to operator input, and taking corrective action when a resource within cluster 5 fails. Cluster engine 206 can use agents, such as virtual machine agent 208 and remote agent 210, to monitor and manage cluster resources. Cluster engine 206 collects information about cluster resource states from agents on the local node and forwards this information to all other cluster members. Cluster engine 206 also receives similar information about cluster resource states from other cluster members.

Virtual machine agent 208 is designed to monitor virtual machine cluster resources such as virtual machine 14(1). Virtual machine agent 208 reports the status of the monitored virtual machine(s) to cluster engine 206. If cluster engine 206 determines that a virtual machine should be failed over to another node, virtual machine agent 208 can also be used to initiate the failover (e.g., by suspending the virtual machine). In some embodiments (e.g., embodiments using ESX Server™ as a virtual machine controller), virtual machine agent 208 executes on the virtual machine controller service console, allowing virtual machine agent 208 to obtain information indicating whether the virtual machine is failed. In other embodiments, public application programming interfaces (APIs) to the virtual machine are used to retrieve information indicating whether the virtual machine is failed.

Remote agent 210 is designed to communicate with sub-cluster controller 22(1)) in order to monitor one or more cluster resources (e.g., application 32(1) or a service group that includes application 32(1)) implemented within virtual machine 14(1). If remote agent 210 detects an error indication generated by sub-cluster controller 22(1) or by a service group controlled by sub-cluster controller 22(1), remote agent 210 can communicate that error indication to cluster engine 206 in much the same way that an application-specific agent executing as part of cluster controller 20(1) would communicate an application error. Accordingly, remote agent 210 acts as a proxy for application-specific agent 204 within cluster controller 20(1), allowing application 32(1) to be monitored as if application 32(1) were executing on the service console running on node 10(1). In this example, remote agent 210 can monitor application 32(1) within virtual machine 14(1) by sending sub-cluster controller 22(1) requests for information generated by and/or the status of application specific agent 204. It is noted that in alternative embodiments, remote agent 210 can monitor application 32(1) by communicating directly with application specific agent 204.

It is noted that if node 10(1) includes several virtual machines, remote agent 210 can be implemented as a multi-threaded agent that is configured to monitor applications and/or other resources within each of the different virtual machines at substantially the same time. Alternatively, cluster controller 20(1) can include multiple instances of remote agent 210, each configured to monitor one or more service groups, applications, or other resources within a respective virtual machine. It is also noted that multiple different types of applications (or other cluster resources of the single-node cluster) can be implemented on virtual machine 14(1), and that sub-cluster controller 22(1) can include a resource-specific agent (such as application-specific agent 204) to monitor each different application or other cluster resource. Also, multiple service groups can be implemented within the single-node cluster, and each service group can monitor a different application and related resources.

In one embodiment, remote agent 210 communicates with sub-cluster controller 22(1) at the kernel level. In such an embodiment, the communication can take place entirely within node 10(1). Such communication can involve remote agent 210 accessing functionality provided by virtual machine controller 16(1) (shown in FIG. 1) for use in controlling and/or monitoring virtual machines.

In an alternative embodiment, remote agent 210 communicates with sub-cluster controller 22(1) via network messaging (e.g., via Internet Protocol (IP) packets). For example, an IP address can be assigned to each virtual machine implemented on node 10(1). An IP address can also be assigned to node 10(1). Remote agent 210 can communicate with sub-cluster controller 22(1) by sending an IP packet to the IP address assigned to virtual machine 14(1). Similarly, sub-cluster controller 22(1) can communicate with remote agent 210 by sending an IP packet to the IP address assigned to node 10(1). It is noted that in at least some situations, such IP packets do not leave node 10(1). For example, the IP packets can be communicated between Network Interface Cards (NICs) within node 10(1) and/or between virtual network interfaces implemented on one or more NICs within node 10(1).

Remote agent 210 can monitor application 32(1) periodically (e.g., by sending a request for the status of application 32(1) and/or application specific agent 204 to sub-cluster controller 22(1) periodically). Remote agent 210 reports the status of application 32(1) to cluster engine 206.

Based on the reported status of application 32(1) and on the reported status of virtual machine 14(1), cluster engine 206 determines whether virtual machine 14(1) should be restarted (e.g., as part of a failover operation) on another node. Thus, the availability of both a virtual machine and an application executing on that virtual machine can be monitored, and on failures of either, the virtual machine can be failed over to another physical node. Cluster engine 206 can cause virtual machine 14(1) to be failed over to another node by causing virtual machine agent 208 to suspend operation of the virtual machine on node 10(1) and communicating with cluster engines in one or more cluster controllers on other nodes that have been configured to implement virtual machine 14(1). The virtual machine agent within one of those other cluster controllers can then cause operation of the suspended virtual machine to resume on a different node.

It is noted that a given cluster controller can include several different remote agents, each configured to monitor a respective application executing on a virtual machine. These remote agents can monitor different applications on different virtual machines, different applications on the same virtual machine, or the same application on different virtual machines. Similarly, each virtual machine can include more than one service group. For example, if there are several different applications executing (or configured to execute) on a virtual machine, the single-node cluster implemented on the virtual machine can include a different service group for each of the applications. In still other embodiments, several single-node clusters can be implemented on a virtual machine (e.g., one for each application being monitored) and operated as proxies for a remote agent of a larger cluster.

While the embodiment of FIG. 2 shows the functionality of cluster controller 20(1) and sub-cluster controller 22(1) subdivided into several different logical components, it is noted that alternative embodiments can implement that functionality using different numbers of logical components, and that the functionality can be subdivided among logical components differently. For example, instead of using different application-specific agents to monitor various types of resources, a cluster controller can include a single monitoring agent that handles several different types of resources. As another example, the functionality of remote agent 210 and virtual machine agent 208 is combined into a single logical component. Similarly, the communication capabilities and application-specific agent 204 of sub-cluster controller 22(1) can be implemented as a single logical component, which can monitor application 32(1) and communicate with cluster controller 20(1). In one embodiment, such a logical component does not include certain cluster functionality (e.g., the logical component can exclude functionality needed to initiate application failovers).

Figure 3:
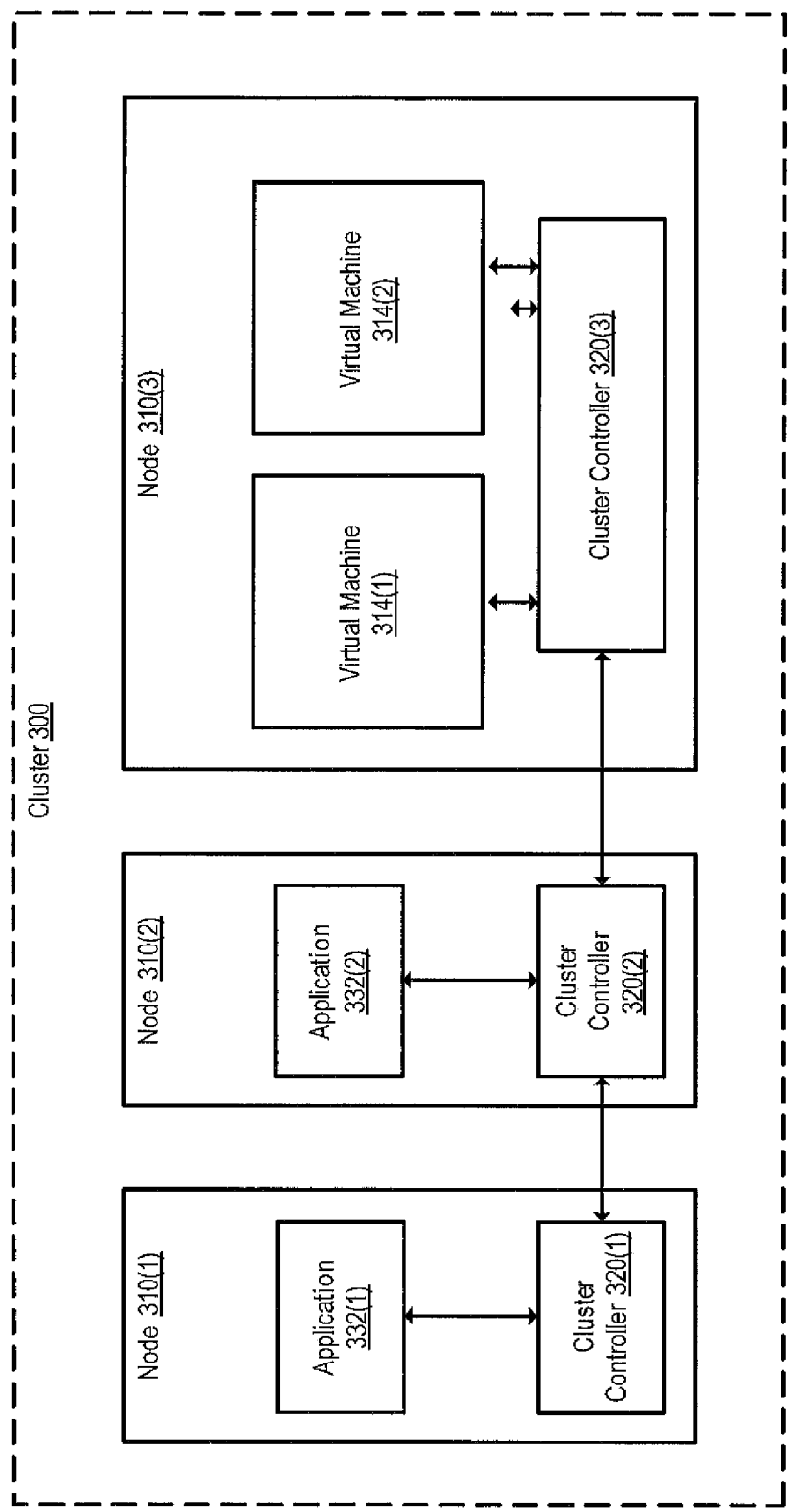
FIG. 3 illustrates another block diagram of a cluster of nodes, some of which include virtual machines, according to one embodiment of the present invention.

FIG. 3 illustrates another block diagram of a cluster 300 of nodes 310(1)-310(3). In this example, one node 310(3) in the cluster includes virtual machines, while other nodes 310(1) and 310(2) in cluster 300 do not. Such a cluster can be used to provide a disaster recovery solution. For example, a user may choose to implement a primary production site using separate physical hosts (e.g., nodes 310(1) and 310(2)), while also choosing to implement a backup site (e.g., using node 310(3)) that uses virtual machines. This can reduce the need to duplicate hardware at the backup site.

As shown in this example, cluster controllers 320(1), 320(2), and 320(2) execute on nodes 310(1), 310(2) and 310(3) respectively. Cluster controllers 320(1) and 320(2) respectively monitor applications 332(1) and 332(2). Cluster controller 320(3) monitors virtual machines 314(1) and 314(2), which are configured on node 310(3).

Virtual machines 314(1) and 314(2) are configured as backups for the physical machines implementing nodes 310(1) and 310(2). Accordingly, if one or both of nodes 310(1) and 310(2) fails, applications 332(1) and/or 332(2) can be restarted on virtual machines 314(1) and 314(2).

If a failure occurs at one or both of the nodes at the primary site, cluster controllers 320(1), 32(2), and/or 320(3) operate to restart applications 332(1) and/or 332(2) on virtual machines 314(1) and/or 314(2). For example, if both nodes 310(1) and 310(2) fail, application 332(1) can be restarted on virtual machine 314(1) and application 332(2) can be restarted on virtual machine 314(2). Cluster controller 320(3) can then continue to monitor the applications, which are now executing on virtual machines, while also monitoring the virtual machines on which the applications are executing, using techniques like those described above. For example, a sub-cluster controller can execute on each virtual machine in order to monitor the state of application(s) executing on each virtual machine. Remote agents within cluster controller 320(3) can communicate with such sub-cluster controllers in order to inform cluster controller 320(3) of the status of the applications.

If one or both of nodes 310(1) and 310(2) are brought back online, cluster controller 320(3) can operate to restart applications 332(1) and/or 332(2) on nodes 310(1) and 310(2). For example, in response to detecting that node 310(1) is functional again, cluster controller 320(3) can use a remote agent to communicate with a sub-cluster controller operating on virtual machine 314(1) in order to shutdown an application executing on the virtual machine. The application can then be restarted on node 310(1) at the primary site.

Figure 4:
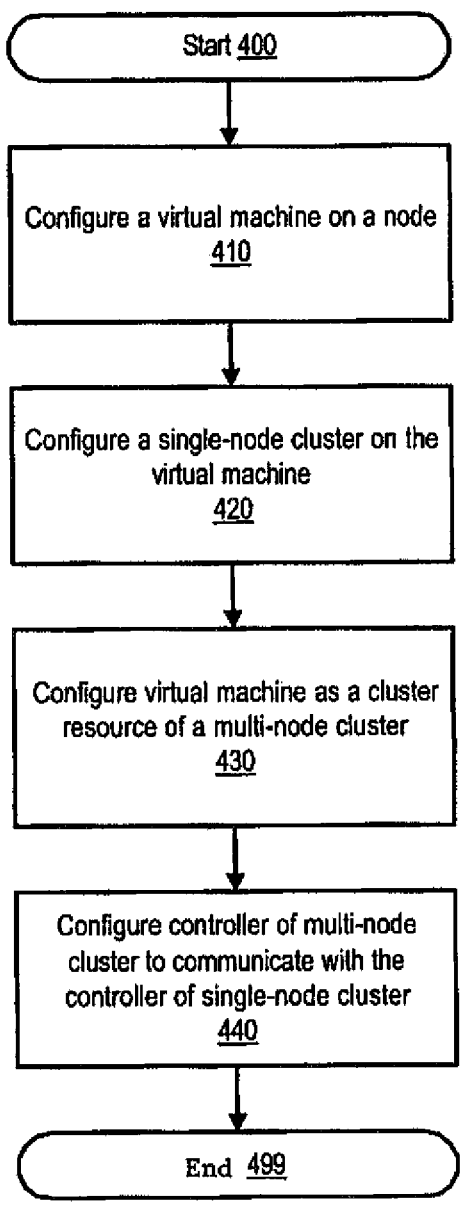
FIG. 4 is a flowchart of a method of configuring a single-node cluster within a node of a larger cluster, according to one embodiment of the present invention.

FIG. 4 is a flowchart of a method of configuring a single-node cluster within a node of a larger cluster. The method begins at 400. At 410, a virtual machine is configured on a node. Configuring the virtual machine can involve using software, such as ESX Server, to setup one or more virtual machines on the node.

At 420, a single-node cluster is configured on the virtual machine. Performing function 420 can involve setting up a cluster controller, such as VERITAS Cluster Server, to execute on the virtual machine and configuring that cluster controller to operate as part of a single-node cluster. The cluster controller can also be configured (not shown) to monitor one or more resources of the single-node cluster, such as applications (e.g., operating systems or user applications) or service groups executing on the single node. For example, the cluster controller can be configured to monitor an application as well as to bring that application online and offline.

The virtual machine is configured as a cluster resource that is monitored by a multi-node cluster, as indicated at 430. For example, a cluster controller executing on the same physical computing device as the virtual machine can be configured to monitor the virtual machine as a cluster resource. In one embodiment, the cluster controller of the multi-node cluster executes on an operating system provided by the software used to implement the virtual machine. It is noted that a different type of operating system may be executing on the virtual machine itself (e.g., a UNIX-based operating system may be executing on the physical computing device, while a WINDOWS-based operating system executes on the virtual machine). The type of cluster controller implemented on the virtual machine may correspondingly differ from the type of cluster controller implemented on the physical computing device.

The cluster controller of the multi-node cluster is also configured to communicate with the controller of the single-node cluster, as shown at 440, in order to monitor the status of a resource that is in turn monitored by the single-node cluster. For example, the cluster controller of the multi-node cluster can include a remote agent, as described above, that is configured to communicate with the cluster controller executing on the virtual machine.

In one embodiment, configuring the cluster controller of the multi-node controller to communicate with the cluster controller of the single-node cluster involves assigning a user-name and password to the cluster controller of the multi-node cluster, allowing the cluster controller of the multi-node controller to access the controller of the single-node cluster via a network. For example, the cluster controller of the multi-node cluster can be configured with a set of attributes that can be used to access the cluster controller of the single node cluster. Such attributes can include the fully qualified network name of the virtual machine and appropriate domain name information, the node name associated with the virtual machine, the name of a group of cluster resources being monitored within the virtual machine, and/or a user name and password.

A resource that is monitored by a cluster can depend upon another resource of the cluster. Cluster controllers track such dependencies in order to be able to start and stop cluster resources in the appropriate order during situations such as cluster initialization and failover. Accordingly, in this example, performing function 440 can also involve configuring the cluster controller of the multi-node cluster to recognize that the cluster resource (of the single-node cluster) that is being monitored within the virtual machine is dependent upon the virtual machine (which is a resource that is monitored by the multi-node cluster).

The method of FIG. 4 ends at 499. It is noted that at least some of the functions 410, 420, 430, and 440 depicted in FIG. 4 can be performed in a different order in other embodiments, and that some embodiments may include other functions instead of and/or in addition to those functions illustrated in FIG. 4.

Figure 5:
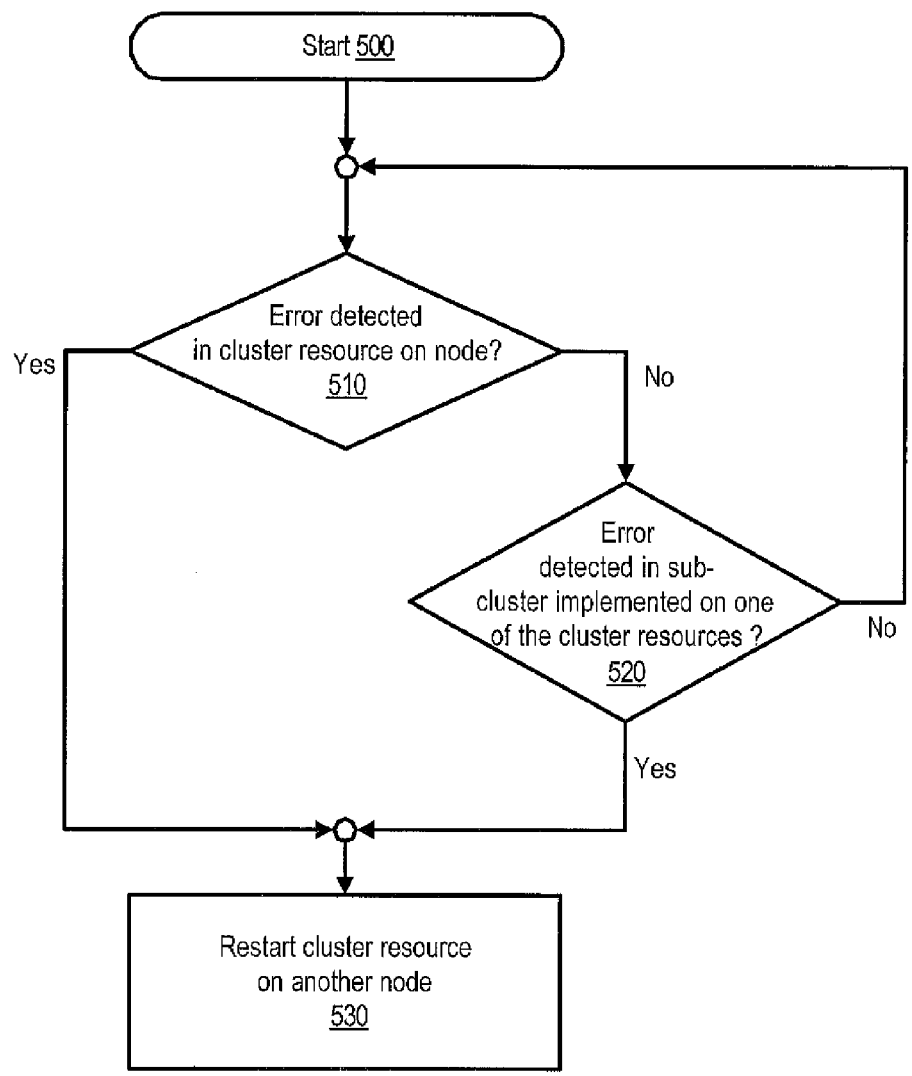
FIG. 5 is a flowchart of a method of restarting a virtual machine on another node in response to an error in the virtual machine or in an application executing on the virtual machine, according to one embodiment of the present invention.

FIG. 5 is a flowchart of a method of restarting a cluster resource in response to the failure of the cluster resource or the failure of a sub-cluster resource, which is implemented on the cluster resource. The method begins at 500.

If an error is detected within a cluster resource on a node, the cluster resource is restarted, as shown at 510 and 530. In FIG. 5, the cluster resource is restarted on a different node (in some situations, such as when failures are caused by transient conditions, the cluster resource may be restarted on the same node). For example, if a virtual machine implemented on the node experiences a failure, the virtual machine can be shut down on the node and restarted on the other node. It is noted that several cluster resources can be organized into a service group, and if any one of those cluster resources experiences a failure, the entire service group may be restarted on another node. Thus, performing function 530 can involve restarting a service group of cluster resources. It is also noted that the cluster controller monitoring the cluster resource can initiate restart of the cluster resource by sending a communication to another cluster controller (e.g., executing on the node on which the cluster resource will be restarted) and/or initiating the shutdown of the cluster resource.

In addition to checking for an error in cluster resource (as shown at 510), the method of FIG. 5 also involves checking for an error in a sub-cluster implemented on one of the cluster resources. If an error is detected within the sub-cluster, the cluster resource (on which the sub-cluster is implemented) is restarted, as shown at 520 and 530. Again, this example shows that the cluster resource is restarted on a different node; however, in some situations, the cluster resource may be restarted on the same node (e.g., if the failure is due to a transient error or a simple software failure).

Checking for an error in the sub-cluster can involve a cluster controller, which is implemented on the node, communicating with a sub-cluster controller implemented on a virtual machine within the node. If the sub-cluster controller has detected a failure in one of the sub-cluster resources, the cluster controller can restart the virtual machine on another node.

Figure 6:
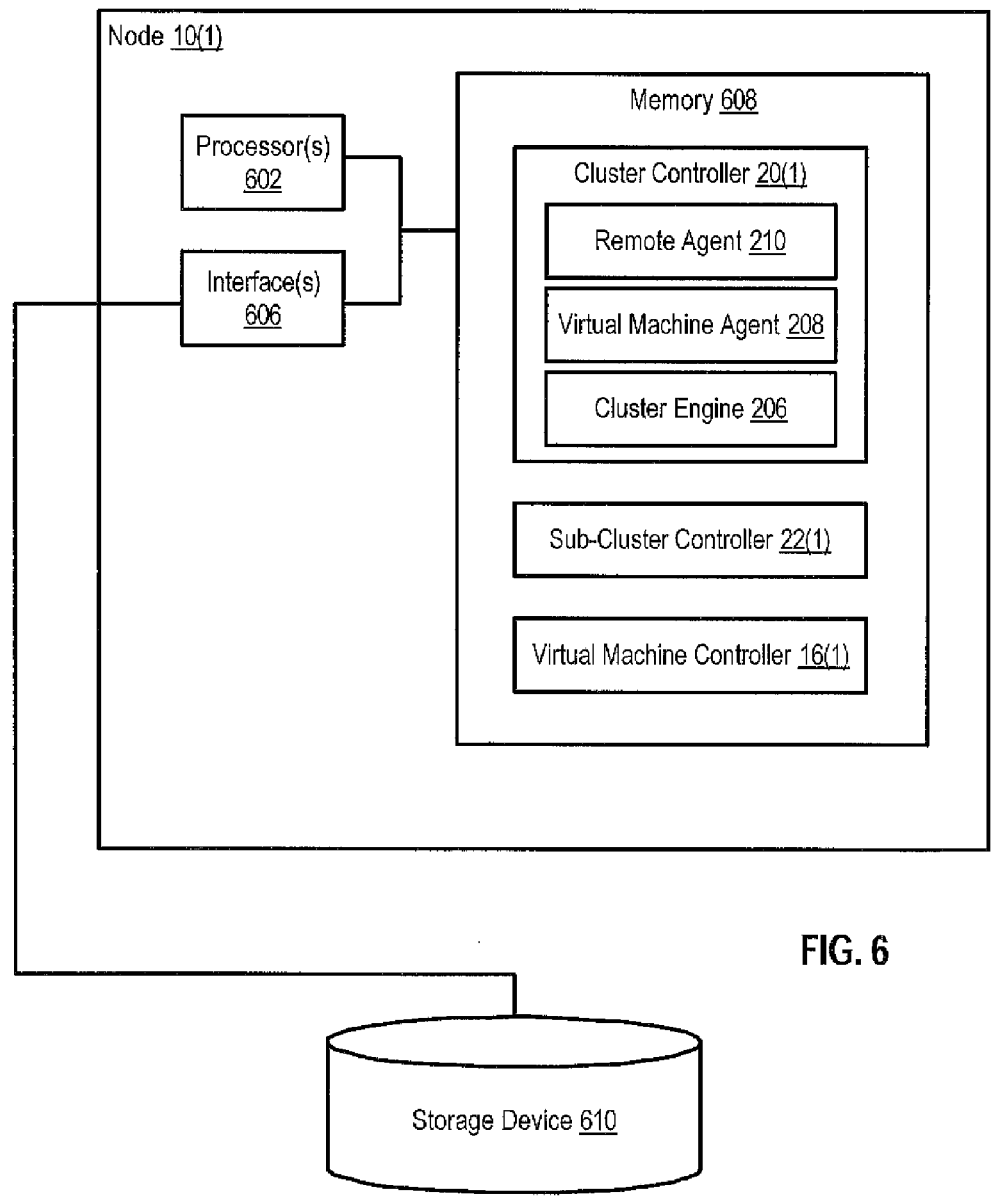
FIG. 6 is a block diagram of a computing device, according to one embodiment of the present invention.

FIG. 6 is a block diagram showing an example of a node 10(1) that can be included in a file server cluster. Node 10(1) includes one or more processors 602, a memory 604, and one or more interfaces 606. Processors 602 can include microprocessors, PLDs (Programmable Logic Devices), ASICS (Application Specific Integrated Circuits), or other devices configured to execute program instructions stored in memory 604. Memory 604 can include various types of RAM (Random Access Memory), ROM (Read Only Memory); Flash memory, MEMS (Micro Electro-Mechanical Systems) memory, and the like. Processors 602, memory 604, and interfaces 606 are coupled to send and receive data and control signals by one or more buses or other interconnects.

Interfaces 606 can include network interfaces to various networks and/or interfaces to various peripheral buses. Interfaces 606 can include an interface to one or more storage devices 610. Interfaces 606 can also include an interface to a network, for use in communicating with other nodes and/or for use in communicating with networked' storage devices. For example, cluster controller 20(1) and/or sub-cluster controller 22(1) can use interfaces 606 to communicate heartbeat messages with other nodes, to communicate with clients or each other, and/or to access a storage volume via a SAN.

Memory 604 stores the data and program instructions, executable by one or more of processors 602, to implement one or more applications. In this example, memory 604 stores data and program instructions implementing cluster controller 20(1) (including cluster engine 206, virtual machine agent 208, and remote agent 210), sub-cluster controller 22(1), and virtual machine controller 16(1). It is noted that a portion of memory 604 may be allocated among various virtual machines by virtual machine controller 16(1), and that sub-cluster controller 22(1), which executes on a virtual machine, is stored in a portion of memory 604 allocated to that virtual machine. The program instructions and data implementing cluster controller 20(1), sub-cluster controller 22(1), and virtual machine controller 16(1) can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order be executed by processor(s) 602, the instructions and data implementing cluster controller 20(1), sub-cluster controller 22(1), and virtual machine controller 16(1) are loaded into memory 604 from the other computer readable medium. Such instructions and/or data can also be transferred to node 10(1) for storage in memory 604 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing cluster controller 20(1), sub-cluster controller 22(1), and virtual machine controller 16(1) are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:
   detecting a fault within a sub-cluster controller, wherein
      the sub-cluster controller controls a sub-cluster, and
      the sub-cluster controller is implemented on a cluster resource; and
   relocating the cluster resource from a first node to a second node in response to detecting the fault.

2. The method of claim 1, wherein
   the sub-cluster is a single-node sub-cluster.

3. The method of claim 1, wherein
   the cluster resource comprises a virtual machine.

4. The method of claim 3, wherein
   the detecting is performed in response to an error condition in an application executing on the virtual machine.

5. The method of claim 3, further comprising:
   detecting a failure of the virtual machine; and
   initiating restart of the virtual machine on the second node in response to the detecting the failure.

6. The method of claim 1, further comprising:
   communicating with a cluster controller configured to control a multi-node cluster, wherein
      the multi-node cluster comprises the first node and the second node.

7. The method of claim 1, wherein
   the fault is detected by a monitoring application executing on the single-node sub-cluster.

8. A non-transitory computer readable storage medium storing program instructions executable to:
   detect a fault within a sub-cluster controller, wherein
      the sub-cluster controller controls a sub-cluster, and
      the sub-cluster controller is implemented on a cluster resource; and
   relocate the cluster resource from a first node to a second node in response to detecting the fault.

9. The non-transitory computer readable storage medium of claim 8, wherein
   the sub-cluster is a single-node sub-cluster.

10. The non-transitory computer readable storage medium of claim 8, wherein
   the cluster resource comprises a virtual machine.

11. The non-transitory computer readable storage medium of claim 10, wherein
   detecting the fault is performed in response to an error condition in an application executing on the virtual machine.

12. The non-transitory computer readable storage medium of claim 10, wherein the program instructions are further executable to:
   detect a failure of the virtual machine; and
   initiate restart of the virtual machine on the second node in response to the detecting the failure.

13. The non-transitory computer readable storage medium of claim 8, wherein the program instructions are further executable to:
   communicate with a cluster controller configured to control a multi-node cluster, wherein the multi-node cluster comprises the first node and the second node.

14. The non-transitory computer readable storage medium of claim 8, wherein
   the fault is detected by a monitoring application executing on the single-node sub-cluster.

15. A system comprising:
   one or more processors; and
   a memory coupled to the one or more processors, wherein the memory stores program instructions executable by the one or more processors to:
      detect a fault within a sub-cluster controller, wherein
         the sub-cluster controller controls a sub-cluster, and
         the sub-cluster controller is implemented on a cluster resource; and
      relocate the cluster resource from a first node to a second node in response to detecting the fault.

16. The system of claim 15, wherein
   the cluster resource comprises a virtual machine.

17. The system of claim 16, wherein
   detecting the fault is performed in response to an error condition in an application executing on the virtual machine.

18. The system of claim 16, wherein the program instructions are further executable to:
   detect a failure of the virtual machine; and
   initiate restart of the virtual machine on the second node in response to the detecting the failure.

19. The system of claim 15, wherein the program instructions are further executable to:
   communicate with a cluster controller configured to control a multi-node cluster, wherein the multi-node cluster comprises the first node and the second node.

20. The system of claim 15, wherein
   the fault is detected by a monitoring application executing on the single-node sub-cluster.

* * * * *